(12) United States Patent
Xie et al.

(10) Patent No.: US 11,558,177 B2
(45) Date of Patent: Jan. 17, 2023

(54) BLOCK CHAIN PERMISSION CONTROL METHOD, DEVICE, AND NODE APPARATUS

(71) Applicant: CloudMinds Robotics Co., Ltd., Shanghai (CN)

(72) Inventors: Hui Xie, Shanghai (CN); Jian Wang, Shanghai (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 1051 days.

(21) Appl. No.: 16/239,359

(22) Filed: Jan. 3, 2019

(65) Prior Publication Data

US 2019/0140822 A1 May 9, 2019

Related U.S. Application Data

(63) Continuation of application No. PCT/CN2016/113739, filed on Dec. 30, 2016.

(51) Int. Cl.
*H04L 29/06* (2006.01)
*H04L 9/06* (2006.01)
(Continued)

(52) U.S. Cl.
CPC ......... *H04L 9/0637* (2013.01); *G06Q 20/065* (2013.01); *G06Q 20/382* (2013.01);
(Continued)

(58) Field of Classification Search
CPC ....... H04L 9/0637; H04L 9/30; H04L 9/3239; H04L 9/3247; H04L 67/104; H04L 9/50;
(Continued)

(56) References Cited

U.S. PATENT DOCUMENTS 8,843,643 B2 * 9/2014 Larson .................... H04L 61/30
  709/227
8,943,201 B2 * 1/2015 Larson .................. H04L 63/029
  709/227
(Continued)

FOREIGN PATENT DOCUMENTS

CN 105488431 A 4/2016
CN 105975868 A 9/2016
(Continued)

OTHER PUBLICATIONS

International search report issued for corresponding International Patent Application No. PCT/CN2016/113739, dated Sep. 28, 2017 with an English translation.
(Continued)

*Primary Examiner* — Mahfuzur Rahman
(74) *Attorney, Agent, or Firm* — Myers Wolin, LLC

(57) ABSTRACT

The present disclosure discloses a method, device and node apparatus for blockchain permission control. The method comprises: receiving target information sent by a node apparatus; acquiring an account address of a configured account of the node apparatus; acquiring, according to the account address, from a predetermined block stored with the account address and an account permission corresponding to the account address, the account permission corresponding to the account address; and processing the target information according to the account permission accordingly. In the present disclosure, node apparatuses are configured with corresponding accounts, and performing permission control on the accounts can restrict permissions of different node apparatuses so as to ensure security and privacy of blockchain data.

11 Claims, 7 Drawing Sheets

Blockchain network
100

(51) Int. Cl.
  *H04L 9/32* (2006.01)
  *H04L 9/30* (2006.01)
  *G06Q 20/06* (2012.01)
  *H04L 67/104* (2022.01)
  *G06Q 20/38* (2012.01)
  *H04L 9/00* (2022.01)
(52) U.S. Cl.
  CPC .............. *H04L 9/30* (2013.01); *H04L 9/3239* (2013.01); *H04L 9/3247* (2013.01); *H04L 67/104* (2013.01); *H04L 9/50* (2022.05)
(58) Field of Classification Search
  CPC .... G06Q 20/065; G06Q 20/382; G06Q 20/02; G06Q 20/223; G06Q 2220/00
  See application file for complete search history.

(56) References Cited

U.S. PATENT DOCUMENTS

| | | | |
|---|---|---|---|
| 9,860,283 B2* | 1/2018 | Munger | .............. H04L 61/5092 |
| 10,511,573 B2* | 12/2019 | Larson | ................ H04L 63/0876 |
| 2016/0267065 A1 | 9/2016 | Drey | |
| 2016/0358135 A1 | 12/2016 | Liao et al. | |
| 2018/0173906 A1* | 6/2018 | Rodriguez | .......... H04L 63/0838 |
| 2018/0176017 A1* | 6/2018 | Rodriguez | .............. H04L 63/20 |
| 2018/0181964 A1* | 6/2018 | Zagarese | .......... G06Q 20/40145 |

FOREIGN PATENT DOCUMENTS

| | | |
|---|---|---|
| CN | 105976232 A | 9/2016 |
| CN | 106100981 A | 11/2016 |

OTHER PUBLICATIONS

First Office Action and Chinese Search Report issued for corresponding Chinese Patent Application No. 201680002973.6, dated Apr. 14, 2020, with machine-generated English translation attached.

* cited by examiner

| 4 bytes | 32 bytes | 32 bytes | 4 bytes | 4 bytes | 4 bytes | |
|---|---|---|---|---|---|---|
| Version number | Parent block hash value | merkle root | Timestamp | Difficulty Target | Nonce | Public key, signature of new block header data |

BLOCK CHAIN PERMISSION CONTROL METHOD, DEVICE, AND NODE APPARATUS

CROSS-REFERENCE TO RELATED APPLICATIONS

This is a continuation application under 35 U.S.C. § 120 of PCT application No. PCT/CN2016/113739 filed on Dec. 30, 2016, the contents of which are incorporated herein by reference.

FIELD OF THE INVENTION

The present disclosure relates to the field of blockchain technology, in particular to a method, device and node apparatus for blockchain permission control.

BACKGROUND OF THE INVENTION

A blockchain is a decentralized distributed database system in which all nodes in a blockchain network participate and maintain. It is composed of a series of data blocks generated on the basis of cryptography, and each data block is a block in the blockchain. According to the sequence of generation time, the blocks are linked together orderly to from a data chain, which is vividly called the blockchain. The blockchain has its own unique protocols for block generation, transaction generation and verification, and has security features such as unchangeability, unforgeability, and full traceability.

A blockchain network is based on a P2P network, and each P2P network node participating in transaction, block storage, verification, and forwarding is a node in the blockchain network. Blockchain data is completely public to each node, and a node can freely check information of any transaction in any block.

Thus, for the blockchain in the related art, as the addition of a node to the chain is not restricted, and data on the chain is completely open, it is suitable for some public and non-privacy information storage, but not suitable for information storage where data on the blockchain has privacy, and cannot achieve limitation on a blockchain operation of an account.

SUMMARY

In order to overcome the problems existing in the related art, the present disclosure provides a method, device and node apparatus for blockchain permission control.

In a first aspect, provided is a method for blockchain permission control, comprising:

receiving target information sent by a node apparatus;

acquiring an account address of a configured account of the node apparatus;

acquiring, according to the account address, from a predetermined block stored with the account address and an account permission corresponding to the account address, the account permission corresponding to the account address; and processing the target information according to the account permission accordingly.

In a second aspect, provided is a method for blockchain permission control applied to a node apparatus in a blockchain network, comprising:

acquiring an account address of a configured account when receiving a transaction generation request;

acquiring, according to the account address and from a block stored with a correspondence between account addresses and account permissions, an account permission corresponding to the account address; and generating and sending a transaction in the case the account permission comprises the permission of generating a transaction.

In a third aspect, provided is a device for blockchain permission control, comprising:

an information receiving module, configured to receive target information sent by a node apparatus;

an account address acquisition module, configured to acquire an account address of a configured account of the node apparatus;

an account permission acquisition module, configured to acquire, according to the account address, from a predetermined block stored with the account address and an account permission corresponding to the account address, the account permission corresponding to the account address; and a processing module, configured to process the target information according to the account permission accordingly.

In a fourth aspect, provided is a device for blockchain permission control applied to a node apparatus in a blockchain network, comprising:

a transaction generation request receiving module, configured to acquire an account address of a configured account when receiving a transaction generation request;

an account permission acquisition module, configured to acquire, according to the account address and from a block stored with a correspondence between account addresses and account permissions, an account permission corresponding to the account address; and a transaction generation module, configured to generate and send a transaction in the case the account permission comprises generating a transaction.

In a fifth aspect, provided is a computer program product, wherein the computer program product comprises a computer program executable by a programmable device, and the computer program comprises a code portion for performing the method according to the first aspect when executed by the programmable device.

In a sixth aspect, provided is a non-temporary computer readable storage medium, wherein the non-temporary computer readable storage medium comprises one or more programs for performing the method according to the first aspect.

In a seventh aspect, provided is a node apparatus, comprising:

the non-temporary computer readable storage medium according to the sixth aspect; and one or more processors, configured to execute the program in the non-temporary computer readable storage medium.

In an eighth aspect, provided is a computer program product, wherein the computer program product comprises a computer program executable by a programmable device, and the computer program comprises a code portion for performing the method according to the second aspect when executed by the programmable device.

In a ninth aspect, provided is a non-temporary computer readable storage medium, wherein the non-temporary computer readable storage medium comprises one or more programs for performing the method according to the second aspect.

In a tenth aspect, provided is a node apparatus, comprising:

the non-transitory computer readable storage medium according to the ninth aspect; and one or more processors, configured to execute the program in the non-transitory computer readable storage medium.

In the present disclosure, node apparatuses are configured with corresponding accounts, and performing permission control on the accounts can restrict permissions of different node apparatuses so as to ensure security and privacy of blockchain data; on the other hand, by controlling access permissions of configured accounts of node apparatuses, a blockchain can be made into a private chain network, preventing unrelated nodes from accessing the network and improving the security of the blockchain; in addition, account permissions can be set through transactions sent by node apparatuses having the account management permission, and account addresses and permissions corresponding to accounts are recorded in a blockchain, so that the permissions of accounts can be queried in the blockchain, account permissions can be prevented from being changed, and the security of the blockchain can be ensured.

It should be understood that the above general description and the subsequent detailed description are illustrative and explanatory, and the present disclosure is not limited thereto.

Other features and advantages of the present disclosure will be described in detail in the part of detailed description which follows.

BRIEF DESCRIPTION OF THE DRAWINGS

The drawings herein are incorporated into the description and form part of the specification, showing embodiments in conformity with the present disclosure, and serving to explain the principles of the present disclosure together with the specification.

DETAILED DESCRIPTION OF THE EMBODIMENTS

Figure 1:
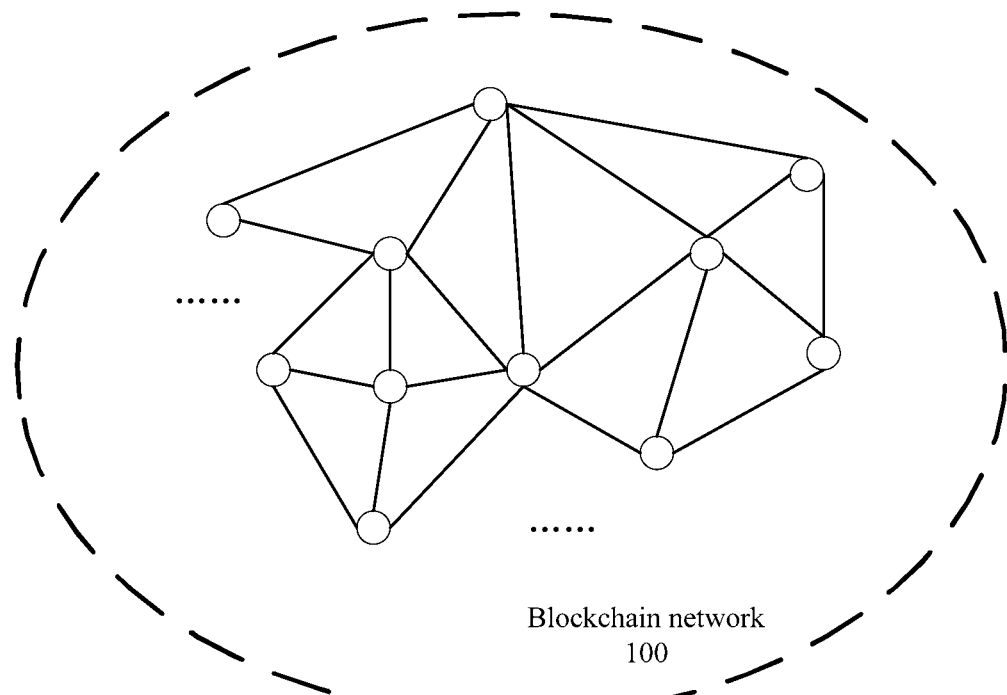
FIG. 1 is a schematic diagram of a blockchain network according to an embodiment of the present disclosure.

The specific embodiments of the present disclosure will be described in detail below with reference to the drawings. It should be understood that the specific embodiments described herein are merely used for illustrating and explaining the present disclosure rather than limiting the present disclosure.

Before describing the method, device and node apparatus for blockchain permission control provided in the present disclosure, a blockchain involved in the various embodiments of the present disclosure is first introduced.

Blockchain node: A blockchain is a decentralized distributed database system in which all nodes in a blockchain network participate in maintenance. It is composed of a series of data blocks generated based on cryptography, each data block is a block in a blockchain. According to the sequence of generation time, the blocks are linked together orderly to from a data chain, which is vividly called the blockchain. Some concepts of a blockchain network will be introduced below.

A node in a blockchain network may be referred to as a blockchain node, wherein the blockchain network is based on a P2P (Peer to Peer) network, and each P2P network node participating in the transaction, block storage, verification, and forwarding is a node in the blockchain network.

User identity: The user identity in the blockchain can be represented by a public key or an account address generated according to the public key, and a public key and a private key appear in pairs, wherein the private key is mastered by a user and not issued to the blockchain network, and the public key or the account address can be freely issued in the blockchain network. The public key may become the account address through a specific hash and encoding. It is worth mentioning that there is no one-to-one correspondence between a user identity and a blockchain node, and a user can use its own private key on any blockchain node.

Blockchain data writing: a blockchain node writes data to a blockchain by issuing a transaction to a blockchain network. The transaction comprises: a transaction data packet generated by the blockchain node according to a preset transaction data format pair, and a digital signature on the transaction data packet by using a private key of the blockchain node, wherein the digital signature is used for proving the identity of a user of the blockchain node; then, after the transaction is issued to the blockchain network, a "miner" (i.e., a blockchain node that implements a PoW (Proof Of Work) consensus competition mechanism) in the blockchain network records the transaction into a new block generated in the blockchain and issues the new block in the blockchain network; after the new block and the transaction recorded by the new block are verified and accepted by other blockchain nodes, the transaction recorded by the new block is written into the blockchain, wherein a new block in the blockchain is periodically generated by said "miner" through the implementation of a consensus competition mechanism such as PoW or PoS, so the time interval for generating new blocks is usually related to the preset technical requirements, and the time interval at which the blockchain generates new blocks can be changed by setting different preset technical requirements.

FIG. 1 is a schematic diagram of a blockchain network according to an embodiment of the present disclosure.

The blockchain network 100 comprises: one or more node apparatuses, which may be implemented in various forms, such as mobile phone, smart phone, notebook computer, digital broadcast receiver, PDA (Personal Digital Assistant), PAD (tablet computer), PMP (Portable Multimedia Player), server, mining machine, etc.

In the present disclosure, node apparatuses are configured with corresponding accounts, and performing permission control on the accounts can restrict permissions of different node apparatuses so as to ensure security and privacy of blockchain data. On the other hand, by controlling access permissions of configured accounts of node apparatuses, a blockchain can be made into a private chain network, preventing unrelated nodes from accessing the network and improving the security of the blockchain.

Figure 2:
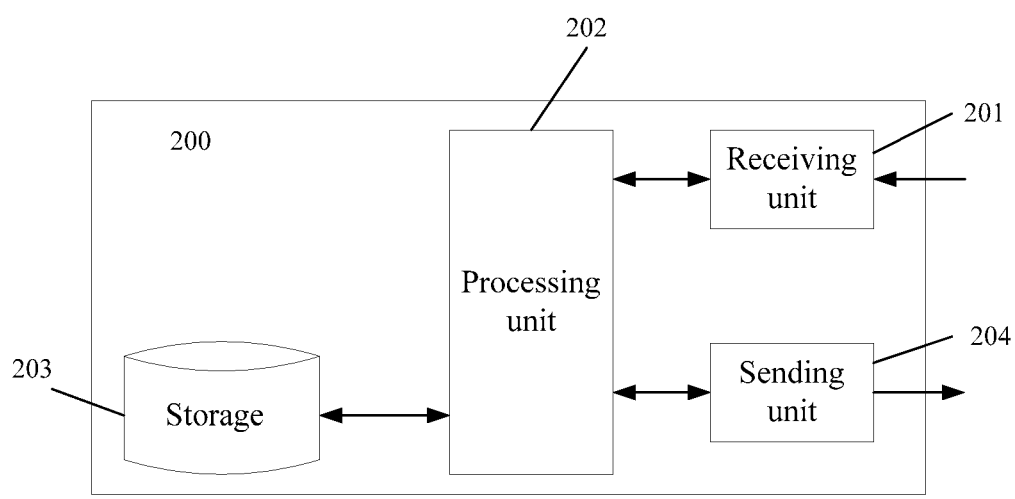
FIG. 2 is a structural diagram of a node apparatus according to an embodiment of the present disclosure.

FIG. 2 is a structural diagram of a node apparatus according to an embodiment of the present disclosure. The node apparatus 200 comprises: a receiving unit 201, a processing unit 202, a storage unit 203, a sending unit 204, and the like.

The receiving unit 201 is configured to perform information reception through one or more networks via one or more network protocols. The received information may comprise: a transaction, a new block, and the like.

The processing unit 202 is configured to perform information processing, such as determining data included in a transaction, verifying the legality of the transaction, and the like when the receiving unit 201 receives a blockchain transaction. In some embodiments, the processing unit 202 is further configured to generate an account address, such as generating an account address using a public key included in the received transaction request, or generating an account address according to a set rule.

The storage unit 203 is configured to perform information storage, such as storing the rules or algorithms for authorizing a transaction, storing a blockchain, and the like.

The sending unit 204 is configured to send information using one or more network protocols via one or more networks. The sent information may comprise: a transaction, a new block, and various requests (e.g., a connection request) and the like.

Figure 3:
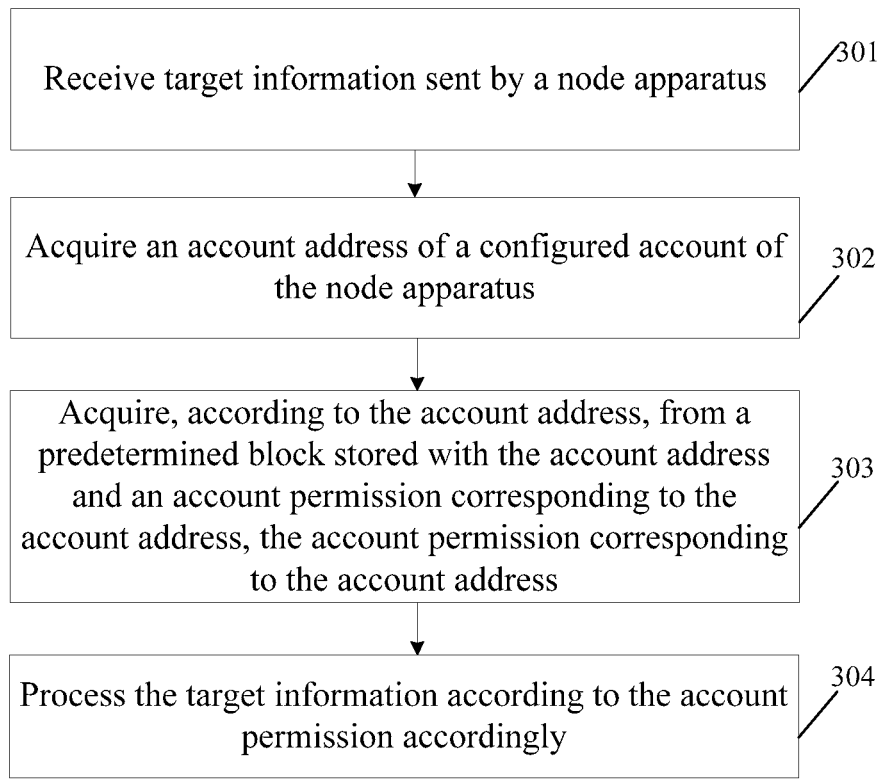
FIG. 3 is a flow diagram of a method for blockchain permission control according to an embodiment of the present disclosure.

See FIG. 3, which is a flow diagram of a method for blockchain permission control according to an embodiment of the present disclosure. The method for blockchain permission control comprises the following steps:

In step 301, target information sent by a node apparatus is received.

In an embodiment of the present disclosure, the target information may include: a network connection request, a transaction, a block, and the like.

In step 302, an account address of a configured account of the node apparatus is acquired.

In step 303, according to the account address, from a predetermined block stored with the account address and an account permission corresponding to the account address, the account permission corresponding to the account address is acquired.

In the embodiments of the present disclosure, account addresses and account permissions corresponding to the account addresses are stored in a predetermined block. In an embodiment, a correspondence between account addresses and account permissions may be stored in a founding block (i.e., the preset block), so that a node apparatus can query in the founding block after initializing and synchronizing the founding block. In some other embodiments, account addresses and account permissions of node apparatuses may also be written into a predetermined block according to the flow as shown in FIG. 4.

Step 304, processing the target information according to the account permission accordingly.

In the embodiments of the present disclosure, according to different target information and different account permissions, the target information is processed differently. For example, processing a network connection request according to account permissions may comprise responding to the network connection request, and performing a network connection.

Figure 4:
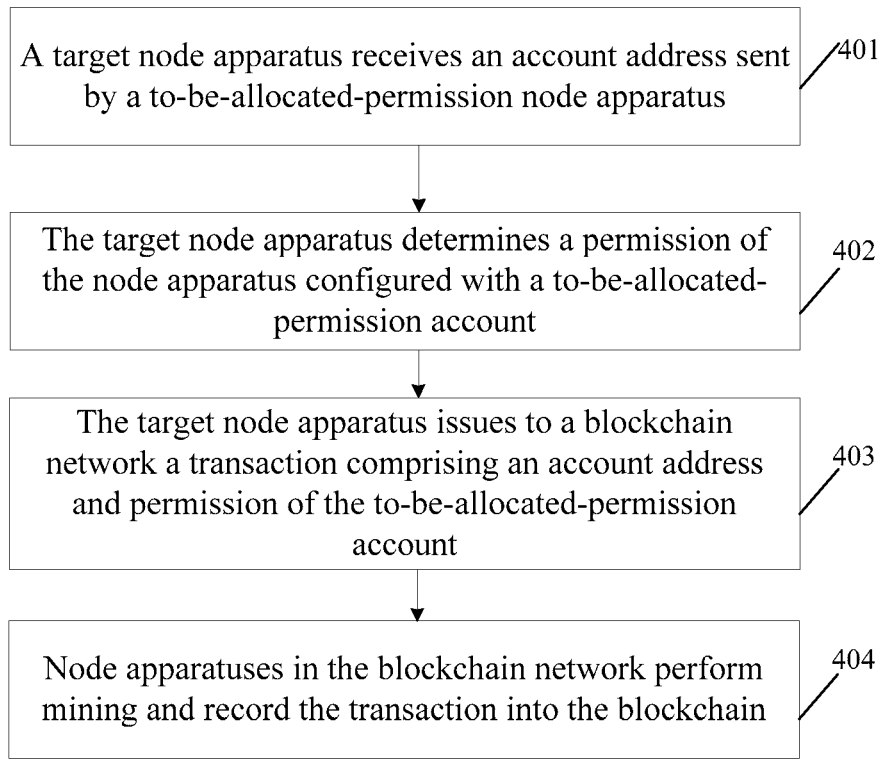
FIG. 4 is a flow diagram of writing a correspondence between account addresses and account permissions into a block according to an embodiment of the present disclosure.

Writing a Correspondence Between Account Addresses and Account Permissions Into a Block See FIG. 4, which is a flow diagram of writing a correspondence between account addresses and account permissions into a block according to an embodiment of the present disclosure.

In step 401, a target node apparatus receives an account address sent by a to-be-allocated-permission node apparatus.

In an embodiment of the present disclosure, the target node apparatus is a node apparatus configured with an account having an account management permission. In an embodiment, in order to ensure that at least one target node apparatus in a blockchain network can perform the process of allocating an account permission, information of at least one account with the account management permission should be recorded in the founding block, so that the node apparatus configured with the account can write account permissions of accounts into the blockchain by issuing a transaction to the blockchain network.

An account address is generated by a node apparatus configured with a to-be-allocated-permission account, and sent to a target node apparatus. In an embodiment, a node apparatus configured with a to-be-allocated-permission account may generate an account address according to a public key.

In step 402, the target node apparatus determines a permission of the node apparatus configured with a to-be-allocated-permission account.

In an embodiment, a permission of an account may be allocated to the account by a node apparatus having the account management permission according to a role of the account. Alternatively, permissions of all accounts may be set in a founding block or a specific block, and thus, it only needs to perform an inquiry in the founding block or the specific block according to account addresses to determine the permission of the to-be-allocated-permission account.

In step 403, the target node apparatus issues to a blockchain network a transaction comprising an account address and permission of the to-be-allocated-permission account.

In step 404, node apparatuses in the blockchain network perform mining and record the transaction into the blockchain.

Thus, account addresses and permissions of accounts are recorded in a block of a blockchain in the form of a transaction, and the block is the predetermined block in the above step 303. If a node apparatus is configured with an account that has been recorded in the blockchain, the node apparatus has permissions of the configured account and can perform operations within the scope of the permissions. See Table 1, which are account permissions that a node apparatus may include according to an embodiment of the present disclosure.

TABLE 1

| Account permission | Description |
|---|---|
| Network connection | Whether a node apparatus configured with the account can establish a network connection with other node apparatuses in a blockchain network |
| Initiating a transfer | A node apparatus configured with the account can be used as the sender of a transfer to send a transaction of the transfer |
| Receiving a transfer | A node apparatus configured with the account can be used as the receiver of a transfer |
| Deploying a smart contract | A node apparatus configured with the account can send a transaction of deploying a smart contract |
| Calling a smart contract | A node apparatus configured with the account can send a transaction of calling a contract |
| Block generation | A node apparatus configured with the account can perform mining (i.e., generating a new block) |
| Account management | A node apparatus configured with the account can send a transaction of setting permissions of other accounts |
| Digital currency issuance | A node apparatus configured with the account can send a transaction of issuing digital currency |

After storing permissions of accounts in a block of a blockchain by the above steps, a node apparatus having the account management permission can also modify permissions of accounts by issuing a transaction.

In the embodiments of the present disclosure, account permissions can be set through transactions sent by node apparatuses having the account management permission, and account addresses and permissions corresponding to accounts are recorded in a blockchain, so that the permissions of accounts can be queried in the blockchain, account permissions can be prevented from being changed, and the security of the blockchain can be ensured.

A Node Apparatus Joins in a Blockchain Network (i.e., Establishing a Connection with a Node in the Blockchain Network)

In the embodiments of the present disclosure, if a node apparatus is configured with an account having the network connection permission, the node apparatus can join in the blockchain network. In an embodiment, a node apparatus that has not joined in the blockchain network but is configured with an account having the network connection permission may send a connection request to a node apparatus in the blockchain network so as to join in the blockchain network. When sending a network connection request, the node apparatus needs to provide a connected node apparatus (i.e., a node apparatus in the blockchain network) with proof of having network connection permission.

Figure 5:
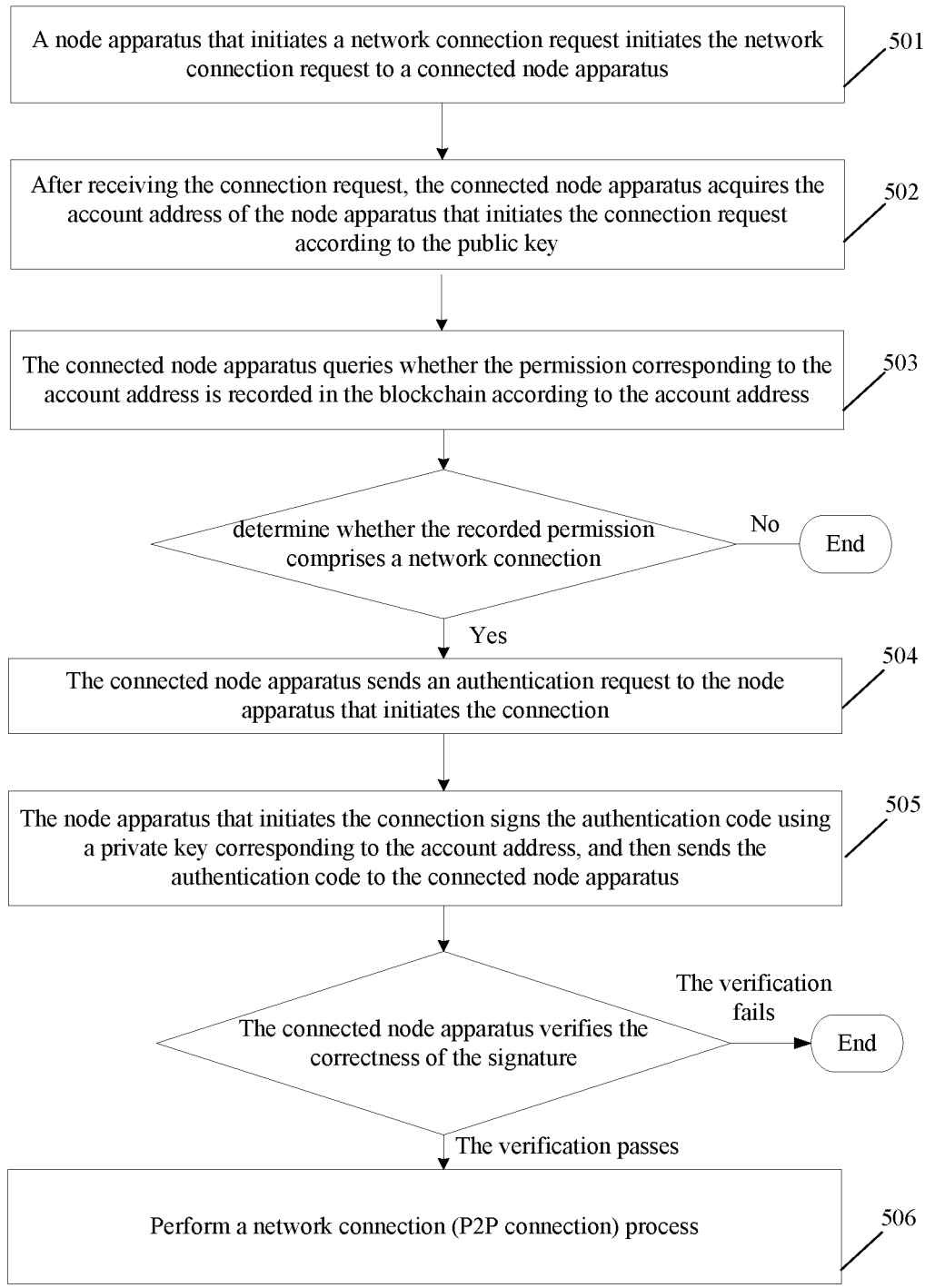
FIG. 5 is a schematic diagram of establishing a network connection between node apparatuses according to an embodiment of the present disclosure.

Referring to FIG. 5, in an embodiment, the target information in step 301 above is a network connection request. In step 501, a node apparatus that initiates a network connection request initiates the network connection request to a connected node apparatus, wherein the network connection request comprises: a public key corresponding to an account address of an account.

In step 502, after receiving the connection request, the connected node apparatus acquires the account address of the node apparatus that initiates the connection request according to the public key.

In step 503, the connected node apparatus queries whether the permission corresponding to the account address is recorded in the blockchain according to the account address, and determines whether the recorded permission comprises a network connection.

If the permission corresponding to the account address comprises the network connection, the process proceeds to step 504; if a permission record corresponding to the account address is not queried or the permission corresponding to the account address does not comprise the network connection, the process ends.

In step 504, the connected node apparatus sends an authentication request to the node apparatus that initiates the connection, wherein the authentication request at least includes: an authentication code. The authentication code is used for further confirming the identity of the node apparatus that initiates the connection, and the authentication code can be any number or a picture containing a number or the like.

In step 505, the node apparatus that initiates the connection signs the authentication code using a private key corresponding to the account address, and then sends the authentication code to the connected node apparatus.

In step 506, the connected node apparatus verifies the validity of the signature, and if the verification passes, a network connection (P2P connection) process is performed; if the verification fails, the process ends, and the node apparatus that initiates the connection cannot join in the blockchain network.

In an embodiment, the connected node apparatus verifies the validity of the signature using the public key.

In an embodiment, the network connection (P2P connection) process may establish a P2P connection for the node apparatus that initiates the connection to communicate with the connected node apparatus by "handshaking" communication to cause the node apparatus that initiates the connection to join in the blockchain network.

Thus, in the embodiments of the present disclosure, only a node apparatus having the network connection permission can access the blockchain network, thereby improving the security of the blockchain.

Transaction Verification

Figures 6, 7:
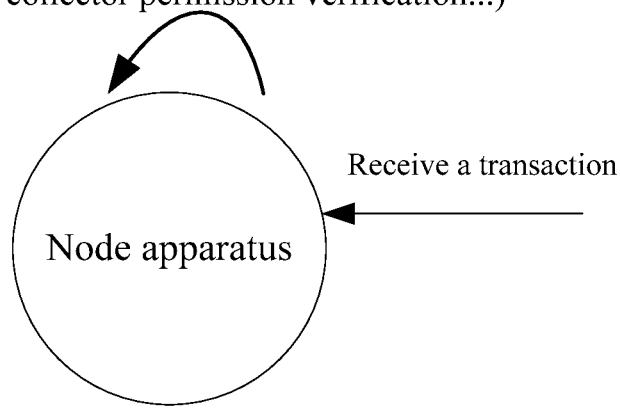
FIG. 6 is a schematic diagram of a node apparatus verifying a transaction according to an embodiment of the present disclosure.
FIG. 7 is a schematic diagram of a block header data structure of a block according to an embodiment of the present disclosure.

Referring to FIG. 6, in the embodiment, the target information is a transaction. After receiving the transaction sent by another node apparatus, the node apparatus verifies account permissions of the sender node apparatus of the transaction, in addition to verifying whether the signature of the transaction is valid and whether the transferor of the transaction has sufficient balance and the like.

In an embodiment, a processing unit of a node apparatus may query, from a blockchain stored by a storage unit, whether permissions of a sender node apparatus include a permission corresponding to the received transaction, to verify the permissions of the sender node apparatus. When all verifications (including whether the signature of the transaction is correct, whether the transferor of the transaction has sufficient balance, whether there is a corresponding permission, etc.) pass, the node apparatus forwards and stores the transaction, and if any verification fails, the node apparatus discards the transaction without carrying out the storage and forwarding work.

In an embodiment, if a transaction received by a node apparatus is a transfer transaction, in addition to the above verifications, permissions of a receiver account also need to be verified. The processing unit of the node apparatus queries, from a blockchain stored by a storage unit, whether the permissions of the receiver account include receiving a transfer, and if the permissions of the receiver account include receiving a transfer, the transaction is forwarded and stored; and if any verification fails, the node apparatus discards the transaction without carrying out the storage and forwarding work.

In the embodiments of the present disclosure, when receiving a transaction, a node apparatus verifies account permissions, and forwards and caches the transaction according to the result of verification, which can filter out transactions generated by accounts having no corresponding permissions, thereby improving network efficiency.

Block Generation and Verification

In an embodiment of the present disclosure, a block may only be generated by a node apparatus configured with an account having the block generation permission.

During the block generation process, a node apparatus determines whether a configured account of its own has the block generation permission. If there is no block generation permission, block generation is not started. If there is the block generation permission, an algorithm such as PoW or POS is executed to generate a new block, and the generated block is sent to the blockchain network.

Referring to FIG. 7, in an embodiment, in order to verify permissions of an account that generated a block, a field for storing generator information of generating a new block is added to the block header of the block. The generator information comprises at least: a public key corresponding to an account address of a configured account of the node apparatus that generates the new block, and a signature of the new block header data.

After any node apparatus performs mining successfully, the generator information is stored in the new field of the new block, and then sent to the blockchain network.

It should be understood that FIG. 7 shows a schematic diagram of a block header data structure according to an exemplary embodiment. In addition to one or two fields in the block header for storing the generator information, other fields can be chosen to set practically according to the blockchain.

Figure 8:
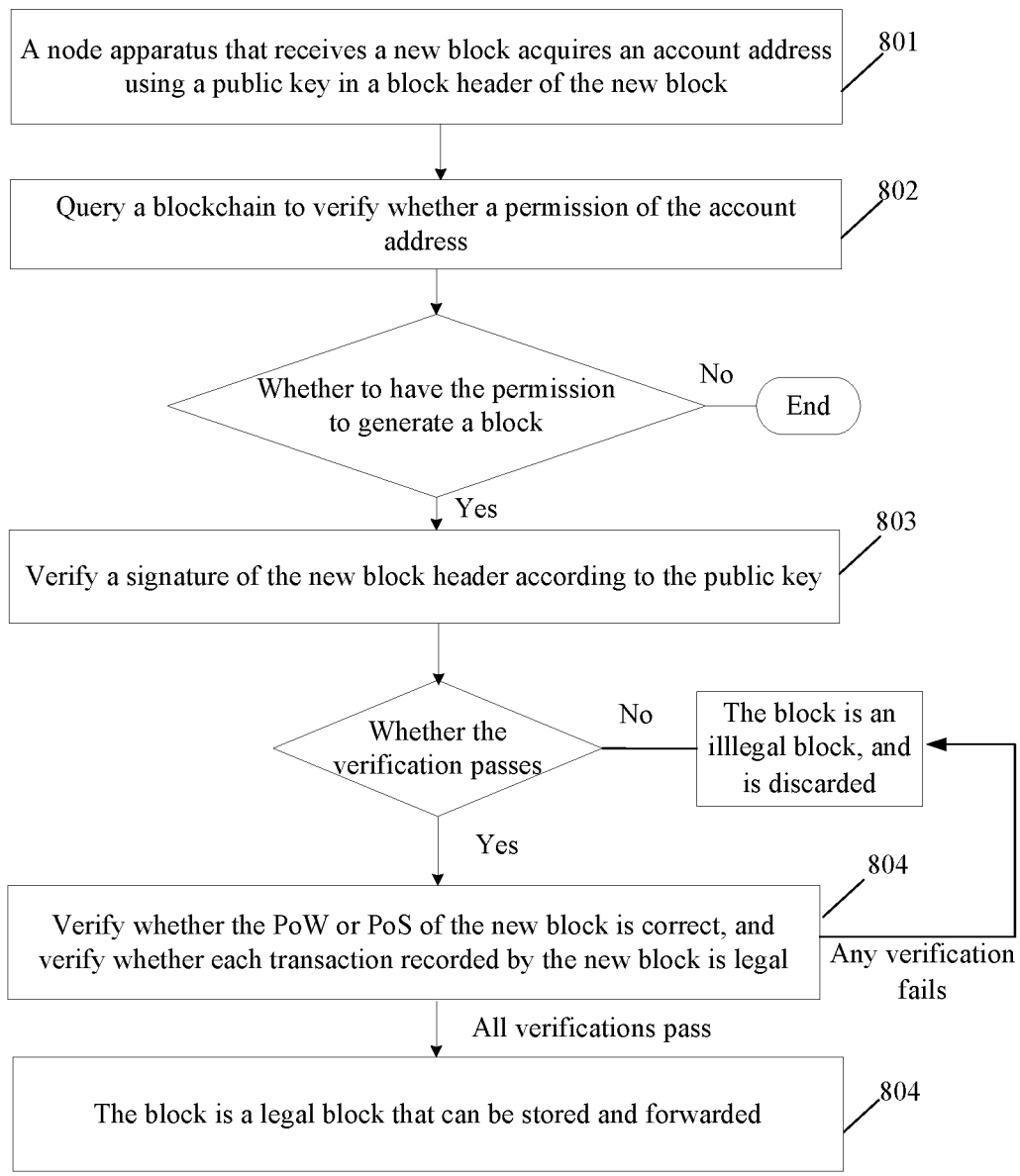
FIG. 8 is a schematic diagram of a verification process of a received block by a node apparatus according to an embodiment of the present disclosure.

Referring to FIG. 8, in an embodiment of the present disclosure, the target information is a block, and the verification process of a node apparatus that receives a block comprises:

In step 801, a node apparatus that receives a new block acquires an account address using a public key in a block header of the new block.

In step 802, a blockchain is queried to verify whether the account address has the permission to generate a block; if there is the permission to generate a block, step 803 is performed; if there is no permission to generate a block, the new block is illegal.

In step 803, a signature of the new block header is verified according to the public key, and if the verification fails, it is determined that the new block is an illegal block; if the verification passes, step 804 is performed.

In step 804, it is verified whether the PoW or PoS of the new block is correct, and whether each transaction recorded by the new block is legal; if any verification fails, it is determined that the block is illegal; if all verifications pass, then it is determined that new block is a legal block.

In the embodiments of the present disclosure, if a new block is illegal, the new block is discarded, and not stored or forwarded; if the new block is legal, new block is stored and forwarded.

It should be understood that the execution sequence of the above steps 801-803 and step 804 can be exchanged, that is, step 804 is performed first, then steps 801-803 are performed, or step 804 and steps 801-803 can be performed simultaneously. The embodiments of the present disclosure are not limited thereto.

In the embodiments of the present disclosure, by adding a field stored with generator information into a block header, verifications of a block generator can be implemented, the generation of an illegal block is avoided, and the security is improved.

Transaction Generation

In an embodiment of the present disclosure, when receiving a transaction generation request, a node apparatus first determines whether a configured account has the permission to generate a corresponding transaction, if so, a transaction is generated and sent, and if not, the process terminates after prompting or reporting an error.

In an embodiment, a processing unit of a node apparatus queries, according to a blockchain stored in a storage unit, whether a configured account has the permission to generate and send corresponding transactions, and the corresponding transactions may comprise: account management, deploying a smart contract, calling a smart contract, initiating a transfer and digital currency issuance, etc. In an embodiment, if the transaction is initiating a transfer, the node apparatus should also verify that the receiver account of the transfer transaction has the permission to receive a transfer. The processing unit of the node apparatus verifies whether the receiver account has the permission to receive a transfer according to the blockchain stored in the storage unit and the account address of the receiver of the transaction. When the transaction initiator has the permission to initiate a transfer and the receiver account has the permission to receive a transfer, the node apparatus sends the transfer transaction.

In the embodiments of the present disclosure, only a node having the permission to send a transaction can send a related transaction, and the transaction sending permission can be determined from the source of the transaction, thus improving the transaction processing efficiency and network efficiency of other node apparatuses.

In an embodiment of the present disclosure, account roles comprise: management account, currency issuance account, supervisory account, bank, and depositor. The permissions corresponding to each role are shown in Table 2.

TABLE 2

| Account role | Permissions |
| --- | --- |
| Management account | Network connection, account permission management, block generation |
| Currency issuance account | Network connection, initiating a transfer, receiving a transfer, block generation, digital currency issuance |
| Supervisory account | Network connection, calling a smart contract, block generation |
| Bank (institution) account | Network connection, initiating a transfer, receiving a transfer, deploying a smart contract, calling a smart contract, block generation |
| User (depositor) account | Network connection, calling a smart contract, block generation |
| Combined/joint account | Implemented through a smart contract, having permissions to initiate a transfer and receive a transfer |

A node apparatus configured with a management account receives an account address sent by a node apparatus configured with a to-be-allocated-permission account, and then sets permissions for the to-be-allocated-permission account according to a role of the account.

In the embodiment, a node apparatus configured with a management account has permissions comprising: network connection, account permission management, block generation, etc. The node apparatus configured with the management account receives an account address, and may set a permission according to a preset allocation rule. For example, the preset allocation rule may be a correspondence between account addresses and account roles, whereby an account role may be determined according to an account address, and a corresponding permission may be further determined.

After a permission of an account is determined, a node apparatus configured with a corresponding account has a corresponding blockchain permission. In an embodiment, a node apparatus configured with an account having the digital currency issuance permission may issue digital currency by issuing a transaction. The issued transaction at least comprises the following information: the amount of the digital currency issued, the owner's account of the digital currency issued. After the transaction is issued to the blockchain network, the node apparatuses in the blockchain network verify the transaction. The verification contents at least comprises: whether the issuing account of the transaction has the permission of issuing digital currency, and whether the signature of the transaction is correct. Thus, through the above method for blockchain permission control, digital currency issuance and permission setting of each account can be implemented; a blockchain for digital currency issuance can be established, and the security of blockchain data is ensured.

In another embodiment of the present disclosure, account roles comprise: administration account, identity certificate issuing account, authenticating user account, and authenticated user account. The permissions corresponding to each role are shown in Table 3.

TABLE 3

| Account role | Permission |
| --- | --- |
| Management account | Network connection, account permission management, block generation |
| Identity certificate issuing account | Network connection, block generation, deploying a smart contract, calling a smart contract |
| Authenticating user account | Network connection, calling a smart contract, block generation |
| Authenticated user account | Network connection, calling a smart contract, block generation |

As in the previous embodiment, a node apparatus configured with a management account receives an account address sent by a node apparatus configured with a to-be-allocated-permission account, and then sets permissions for the to-be-allocated-permission account according to a role of the account. In the embodiment, a node apparatus configured with a management account has permissions comprising: network connection, account permission management, block generation, etc.

The node apparatus configured with the management account receives an account address, and may set a permission according to a preset allocation rule. For example, the preset allocation rule may be a correspondence between account addresses and account roles, whereby an account role may be determined according to an account address, and a corresponding permission may be further determined.

After a permission of an account is determined, a node apparatus configured with a corresponding account has a corresponding blockchain permission. A node apparatus configured with an identity certificate issuing account may issue a smart contract for recording identity information of a user account, and is responsible for writing the identity information of the user account to the smart contract. A node apparatus configured with an authenticating user account may read identity information of an authenticated user account from a smart contract, and authenticate the authenticated party based on the information. A node apparatus configured with an authenticated user account may generate an account address, notify an identity certificate issuing account of identity information such as the address and public key, and record the identity information into a smart contract through the identity certificate issuing account.

Thus, the embodiment can implement identity authentication, establish a blockchain for identity authentication, and ensure the security of blockchain data.

Figure 9:
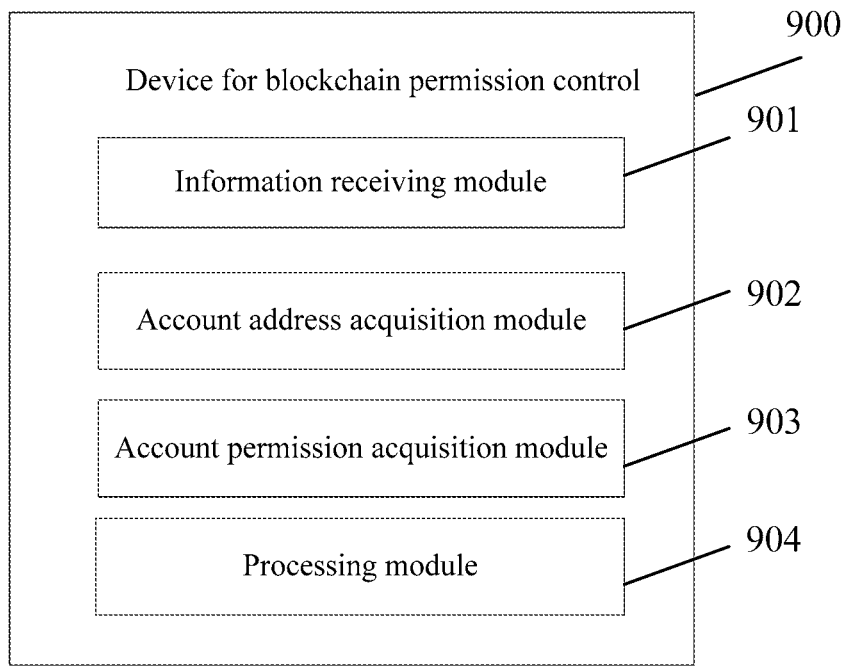
FIG. 9 is a block diagram of a device for blockchain permission control according to an embodiment of the present disclosure.

Referring to FIG. 9, correspondingly, an embodiment of the present disclosure further provides a device for blockchain permission control. The device for blockchain permission control 900 comprises:

an information receiving module 901, configured to receive target information sent by a node apparatus;

an account address acquisition module 902, configured to acquire an account address of a configured account of the node apparatus;

an account permission acquisition module 903, configured to acquire, according to the account address, from a predetermined block stored with the account address and an account permission corresponding to the account address, the account permission corresponding to the account address; and a processing module 904, configured to process the target information according to the account permission accordingly.

In an embodiment, the device 900 further comprises:

an account address receiving module, configured to receive an account address of a configured account sent by the node apparatus;

a permission allocation module, configured to allocate an account permission for the configured account; and a transaction issuance module, configured to issue to a blockchain network a transaction including the account address and the account permission of the configured account, the transaction being used for storing the account address and the account permission of the configured account of the node apparatus to the predetermined block.

In an embodiment, the target information is a network connection request, and the network connection request comprises: a public key of the configured account of the node apparatus;

the account address acquisition module 902 is configured to acquire the account address of the configured account according to the public key.

In an embodiment, the processing module 904 comprises:

an authentication request sending sub-module, configured to send an authentication request to the node apparatus in the case the account permission corresponding to the account address comprises network connection, where the authentication request at least comprises an authentication code;

a signature sub-module, configured to receive a signature of the authentication code by the node apparatus using a private key corresponding to the account address of the configured account;

a verification sub-module, configured to verify the signature according to a public key corresponding to the account address; and a connection establishment sub-module, configured to establish a network connection with the node apparatus when the verification of the signature passes.

In an embodiment, the target information is a transaction; the processing module comprises:

a transaction processing sub-module, configured to forward and store the received transaction in the case the account permission of the configured account of the node apparatus comprises generating a transaction.

In an embodiment, the target information is a transfer transaction, and the transfer transaction at least comprises: an account address of a receiver account;

the processing module comprises:

a receiver account permission acquisition sub-module, configured to acquire, according to the account address of the receiver account, from a block stored with a correspondence between the account address and an account permission of the receiver account, the account permission corresponding to the account address of the receiver account in the case the account permission of the configured account of the node apparatus comprises initiating a transfer; and a transfer transaction processing sub-module, configured to forward and store the transfer transaction in the case the account permission corresponding to the account address of the receiver account comprises receiving a transfer.

In an embodiment, the target information is a block created by the node apparatus, and a block header of the block comprises a field for recording a public key and a signature of block header data;

the account address acquisition module is configured to acquire the account address according to the public key in the block header of the block.

In an embodiment, the processing module comprises:

a block processing sub-module, configured to forward and store the received block in the case the account permission of the configured account of the node apparatus comprises generating a block.

Figure 10:
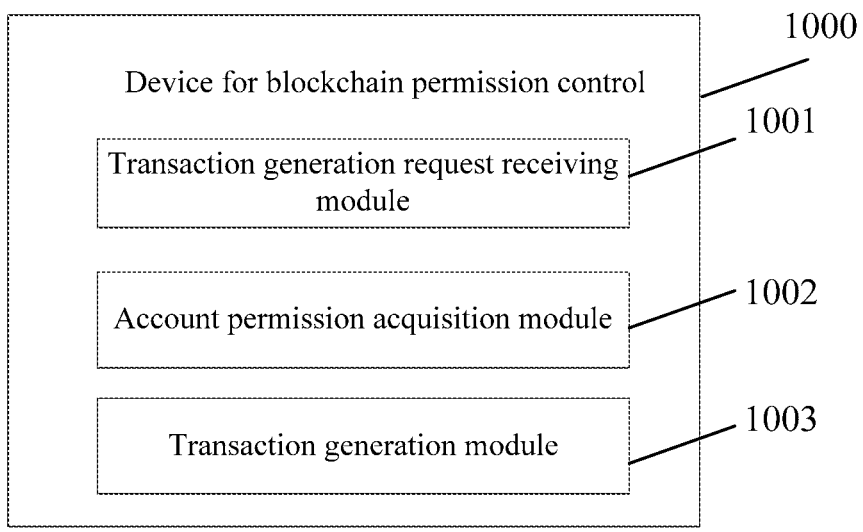
FIG. 10 is a block diagram of a device for blockchain permission control according to another embodiment of the present disclosure.

Referring to FIG. 10, correspondingly, an embodiment of the present disclosure further provides a device for blockchain permission control. The device for blockchain permission control 1000 comprises:

a transaction generation request receiving module 1001, configured to acquire an account address of a configured account when receiving a transaction generation request;

an account permission acquisition module 1002, configured to acquire, according to the account address, from a block stored with a correspondence between account addresses and account permissions, an account permission corresponding to the account address; and a transaction generation module 1003, configured to generate and send a transaction in the case the account permission comprises generating a transaction.

In an embodiment, the transaction is a transfer transaction; the device further comprises:

a receiver conversion permission acquisition module, configured to acquire, according to an account address of a receiver account, from a block stored with a correspondence between the account address and an account permission of the receiver account, the account permission corresponding to the account address of the receiver account in the case the account permission comprises generating a transaction; and a transfer transaction generation module, configured to generate and send the transfer transaction in the case the account permission of the receiver account comprises receiving a transfer.

With regard to the device in the above embodiments, the specific manners in which the respective modules perform the operations have been described in detail in the embodiments relating to the method, and will not be explained in detail herein.

Figure 11:
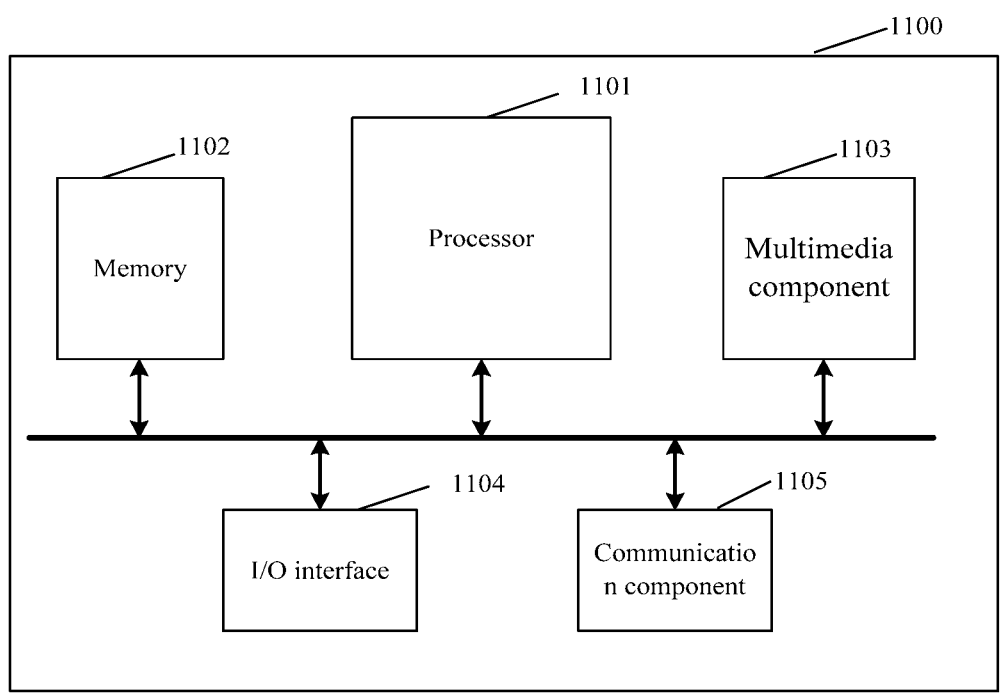
FIG. 11 is a block diagram of a device for a method for blockchain permission control according to an exemplary embodiment.

FIG. 11 is a block diagram of a device 1100 for a method for blockchain permission control according to an exemplary embodiment, and the device 1100 may be a node apparatus in a blockchain. As shown in FIG. 11, the device 1100 may comprise: a processor 1101, a memory 1102, a multimedia component 1103, an input/output (I/O) interface 1104, and a communication component 1105.

The processor 1101 is configured to control the overall operation of the device 1100 to complete all or part of the steps of the method for blockchain permission control. The memory 1102 is configured to store an operating system and various types of data to support an operation at the device 1100, for example, the data may be an instruction for any application program or method operating on the device 1100, and data related to an application program. The memory 1102 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The multimedia component 1103 may comprises a screen and an audio component. The screen may be, for example, a touch screen, and the audio component is configured to output and/or input an audio signal. For example, the audio component may comprise a microphone for receiving an external audio signal. The received audio signal may be further stored in memory 1102 or sent via the communication component 1105. The audio component further comprises at least one speaker for outputting an audio signal. The I/O interface 1104 provides an interface between the processor 1101 and other interface modules which may be keyboard, mouse, button, and the like. These buttons can be virtual buttons or physical buttons. The communication component 1105 is configured to perform a wired or wireless communication between the device 1100 and other devices. The wireless communication may be such as Wi-Fi, Bluetooth, near field communication (NFC), 2G, 3G or 4G, or a combination of one or more thereof, so the corresponding communication component 1105 may comprise: a Wi-Fi module, a Bluetooth module, and an NFC module.

In an exemplary embodiment, the device 1100 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above-mentioned method for blockchain permission control.

In another exemplary embodiment, further provided is a computer program product, wherein the computer program product comprises a computer program executable by a programmable device, and the computer program comprises a code portion for performing the above-mentioned method for blockchain permission control when executed by the programmable device.

In another exemplary embodiment, further provided is a non-temporary computer readable storage medium comprising instructions, such as the memory 1102 comprising instructions that is executable by the processor 1101 of the device 1100 to perform the method for above-mentioned blockchain permission control. For example, the non-temporary computer readable storage medium may be a ROM, a random access memory (RAM), a CD-ROM, a magnetic tape, a floppy disk, and an optical data storage device, etc.

Any description of a process or method described in a flowchart or in other ways in the embodiments of the present disclosure may be understood to represent a module, fragment, or portion of a code comprising one or more executable instructions for implementing a particular logical function or step of a process; in addition, the scope of the embodiments of the present disclosure includes additional implementations in which functions may be performed in a manner that is not in the order shown or discussed, including in a substantially simultaneous manner or in reverse order, according to the functions involved, which should be understood by those skilled in the art as described in the embodiments of the present disclosure.

The preferred embodiments of the present disclosure have been described in detail above with reference to the accompanying drawings. However, the present disclosure is not limited to the specific details of the embodiments described above, and various simple modifications of the technical solutions of the present disclosure may be made within the scope of the technical idea of the present disclosure. These simple modifications are within the scope of the present disclosure.

The invention claimed is:

1. A method for blockchain permission control, comprising:
   receiving target information sent by a node apparatus;
   acquiring an account address of a configured account of the node apparatus;
   acquiring, according to the account address, from a predetermined block stored with the account address and an account permission corresponding to the account address, the account permission corresponding to the account address; and
   processing the target information according to the account permission accordingly, and
   wherein the target information is a network connection request, and the network connection request comprises: a public key of the configured account of the node apparatus;
   the step of acquiring an account address of a configured account of the node apparatus comprises:
   acquiring the account address of the configured account according to the public key, and
   wherein the step of processing the target information according to the account permission accordingly comprises:
   in the case the permission corresponding to the account address comprises a network connection, sending an authentication request to the node apparatus, wherein the authentication request at least includes an authentication code;
   receiving a signature on the authentication code using a private key corresponding to the account address of the configured account of the node apparatus;
   verifying the signature according to a public key corresponding to the account address; and
   when the verification of the signature passes, establishing a network connection with the node apparatus, and
   wherein the target information is a block created by the node apparatus, and a block header of the block comprises a field for recording a public key and a signature of block header data;
   the step of acquiring an account address of a configured account of the node apparatus comprises:
   acquiring the account address according to the public key in the block header of the block.

2. The method according to claim 1, further comprising:
   receiving an account address of a configured account sent by the node apparatus;
   allocating an account permission for the configured account; and
   issuing to a blockchain network a transaction including the account address and the account permission of the configured account, the transaction being used for storing the account address and the account permission of the configured account of the node apparatus to the predetermined block.

3. The method according to claim 1, wherein the target information is a transaction;
   the step of processing the target information according to the account permission accordingly comprises:
   forwarding and storing the received transaction in the case the account permission of the configured account of the node apparatus comprises generating a transaction.

4. The method according to claim 1, wherein the target information is a transfer transaction, and the transfer transaction at least comprises an account address of a receiver account;
   the step of processing the target information according to the account permission accordingly comprises:
   acquiring, according to the account address of the receiver account, from a block stored with a correspondence between the account address and an account permission of the receiver account, the account permission corresponding to the account address of the receiver account in the case the account permission of the configured account of the node apparatus comprises initiating a transfer; and
   forwarding and storing the transfer transaction in the case the account permission corresponding to the account address of the receiver account comprises receiving a transfer.

5. The method according to claim 1, wherein the step of processing the target information according to the account permission accordingly comprises:
   forwarding and storing the received block in the case the account permission of the configured account of the node apparatus comprises generating a block.

6. A method for blockchain permission control, applied to a node apparatus in a blockchain network, comprising:
   acquiring an account address of a configured account when receiving a transaction generation request;
   acquiring, according to the account address, from a block stored with a correspondence between account addresses and account permissions, an account permission corresponding to the account address; and
   generating and sending a transaction in the case the account permission comprises a permission of generating a transaction, and
   wherein a target information is a network connection request, and the network connection request comprises: a public key of the configured account of the node apparatus;
   the step of acquiring an account address of a configured account of the node apparatus comprises:
   acquiring the account address of the configured account according to the public key, and
   wherein processing a target information according to the account permission accordingly comprises:
   in the case the permission corresponding to the account address comprises a network connection, sending an authentication request to the node apparatus, wherein the authentication request at least includes an authentication code;
   receiving a signature on the authentication code using a private key corresponding to the account address of the configured account of the node apparatus;
   verifying the signature according to a public key corresponding to the account address; and when the verification of the signature passes, establishing a network connection with the node apparatus, and wherein the target information is a block created by the node apparatus, and a block header of the block comprises a field for recording a public key and a signature of block header data;

the step of acquiring an account address of a configured account of the node apparatus comprises:

acquiring the account address according to the public key in the block header of the block.

7. The method according to claim 6, wherein the transaction is a transfer transaction; and the step of generating and sending a transaction in the case the account permission comprises a permission of generating a transaction comprises:

acquiring, according to an account address of a receiver account, from a block stored with a correspondence between the account address and an account permission of the receiver account, the account permission corresponding to the account address of the receiver account in the case the account permission comprises generating a transaction; and generating and sending the transfer transaction in the case the account permission of the receiver account comprises receiving a transfer.

8. A non-transitory computer readable storage medium, comprising one or more programs for performing a method for blockchain permission control comprising:

receiving target information sent by a node apparatus;

acquiring an account address of a configured account of the node apparatus;

acquiring, according to the account address, from a predetermined block stored with the account address and an account permission corresponding to the account address, the account permission corresponding to the account address; and processing the target information according to the account permission accordingly, and wherein the target information is a network connection request, and the network connection request comprises: a public key of the configured account of the node apparatus;

the step of acquiring an account address of a configured account of the node apparatus comprises:

acquiring the account address of the configured account according to the public key, and wherein the step of processing the target information according to the account permission accordingly comprises:

in the case the permission corresponding to the account address comprises a network connection, sending an authentication request to the node apparatus, wherein the authentication request at least includes an authentication code;

receiving a signature on the authentication code using a private key corresponding to the account address of the configured account of the node apparatus;

verifying the signature according to a public key corresponding to the account address; and when the verification of the signature passes, establishing a network connection with the node apparatus, and wherein the target information is a block created by the node apparatus, and a block header of the block comprises a field for recording a public key and a signature of block header data;

the step of acquiring an account address of a configured account of the node apparatus comprises:

acquiring the account address according to the public key in the block header of the block.

9. A node apparatus, comprising:

a storage storing computer program; and one or more hardware processors configured to execute the program in the storage to perform a method for blockchain permission control comprising:

receiving target information sent by a node apparatus;

acquiring an account address of a configured account of the node apparatus;

acquiring, according to the account address, from a predetermined block stored with the account address and an account permission corresponding to the account address, the account permission corresponding to the account address; and processing the target information according to the account permission accordingly, and wherein the target information is a network connection request, and the network connection request comprises: a public key of the configured account of the node apparatus;

the step of acquiring an account address of a configured account of the node apparatus comprises:

acquiring the account address of the configured account according to the public key, and wherein the step of processing the target information according to the account permission accordingly comprises:

in the case the permission corresponding to the account address comprises a network connection, sending an authentication request to the node apparatus, wherein the authentication request at least includes an authentication code;

receiving a signature on the authentication code using a private key corresponding to the account address of the configured account of the node apparatus;

verifying the signature according to a public key corresponding to the account address; and when the verification of the signature passes, establishing a network connection with the node apparatus, and wherein the target information is a block created by the node apparatus, and a block header of the block comprises a field for recording a public key and a signature of block header data;

the step of acquiring an account address of a configured account of the node apparatus comprises:

acquiring the account address according to the public key in the block header of the block.

10. A non-transitory computer readable storage medium, comprising one or more programs for performing a method for blockchain permission control comprising:

acquiring an account address of a configured account when receiving a transaction generation request;

acquiring, according to the account address, from a block stored with a correspondence between account addresses and account permissions, an account permission corresponding to the account address; and generating and sending a transaction in the case the account permission comprises a permission of generating a transaction, and wherein a target information is a network connection request, and the network connection request comprises: a public key of the configured account of the node apparatus;

the step of acquiring an account address of a configured account of the node apparatus comprises:

acquiring the account address of the configured account according to the public key, and
wherein processing the target information according to the account permission accordingly comprises:
in the case the permission corresponding to the account address comprises a network connection, sending an authentication request to the node apparatus, wherein the authentication request at least includes an authentication code;
receiving a signature on the authentication code using a private key corresponding to the account address of the configured account of the node apparatus;
verifying the signature according to a public key corresponding to the account address; and
when the verification of the signature passes, establishing a network connection with the node apparatus, and
wherein the target information is a block created by the node apparatus, and a block header of the block comprises a field for recording a public key and a signature of block header data;
the step of acquiring an account address of a configured account of the node apparatus comprises:
acquiring the account address according to the public key in the block header of the block.

11. A node apparatus, comprising:
a storage storing computer program; and
one or more hardware processors configured to execute the program in the storage to perform a method for blockchain permission control comprising:
acquiring an account address of a configured account when receiving a transaction generation request;
acquiring, according to the account address, from a block stored with a correspondence between account addresses and account permissions, an account permission corresponding to the account address; and
generating and sending a transaction in the case the account permission comprises a permission of generating a transaction, and
wherein a target information is a network connection request, and the network connection request comprises:
a public key of the configured account of the node apparatus;
the step of acquiring an account address of a configured account of the node apparatus comprises:
acquiring the account address of the configured account according to the public key, and
wherein processing the target information according to the account permission accordingly comprises:
in the case the permission corresponding to the account address comprises a network connection, sending an authentication request to the node apparatus, wherein the authentication request at least includes an authentication code;
receiving a signature on the authentication code using a private key corresponding to the account address of the configured account of the node apparatus;
verifying the signature according to a public key corresponding to the account address; and
when the verification of the signature passes, establishing a network connection with the node apparatus, and
wherein the target information is a block created by the node apparatus, and a block header of the block comprises a field for recording a public key and a signature of block header data;
the step of acquiring an account address of a configured account of the node apparatus comprises:
acquiring the account address according to the public key in the block header of the block.

* * * * *